Dec. 13, 1949　　　DU BOIS EASTMAN　　　2,491,303
CATALYTIC CONVERSION OF HYDROCARBON OIL
Filed Sept. 23, 1946　　　2 Sheets-Sheet 1

INVENTOR.
DU BOIS EASTMAN
BY Daniel Stryker
Attorney

Patented Dec. 13, 1949

2,491,303

UNITED STATES PATENT OFFICE 2,491,303

CATALYTIC CONVERSION OF HYDRO-CARBON OIL du Bois Eastman, Scarsdale, N. Y., assignor to The Texas Company, New York, N. Y., a corporation of Delaware Application September 23, 1946, Serial No. 698,732

5 Claims. (Cl. 196—52)

This invention relates to certain improvements in the catalytic conversion of hydrocarbons and is concerned with a process in which products of reaction in the form of coke or hydrocarbonaceous material are deposited on a solid catalyst in the processing of the hydrocarbon and in which the operation is conducted with alternating periods of processing and regenerating, the coke which is deposited on the catalyst during processing being burned during regenerating.

The invention contemplates an extremely short cycle of processing and regenerating. The activity of solid catalytic materials used in the catalytic cracking of hydrocarbon oils depreciates with time of contacting at a very rapid rate. In accordance with the invention, the processing cycle is of such short duration as to obtain a more effective use of the initial activity of the catalyst than has been obtained heretofore. The invention involves, moreover, a cooperating regenerating cycle of extremely limited duration. The amount of coke or hydrocarbonaceous material (hereinafter referred to as carbon), which is deposited on the catalyst in the processing cycle, is so small that its entire heat of combustion can be absorbed by the catalyst mass with only a moderate temperature rise, thereby avoiding injury to the catalyst. The temperature rise of the catalyst depends on the heat generated per cycle so that by shortening the cycle the temperature rise per cycle is reduced; in other words, there is insufficient time for the temperature to rise high enough to impair the catalyst. I find, however, that in spite of the moderate temperature rise in the catalyst upon regeneration, sufficient heat can be stored in the catalyst mass to raise the entering oil in the succeeding processing period to the desired reaction temperature and due to the limited duration of the processing cycle maintain such temperature during the processing cycle. Thus by means of the rapid sequence of processing and regenerating a high catalyst activity is maintained and the heat of regeneration is utilized effectively to maintain the reaction temperature for processing.

In prior catalytic cracking operations, it has been necessary either to apply cooling directly to the catalyst bed during regeneration or to dilute the air or oxidizing gas, as with flue gas, so as to prevent an excessive rise in temperature which would impair the catalyst. The process of the invention renders such expedients unnecessary. The rapid sequence of regenerating and processing functions to prevent an excessive temperature rise during the regeneration periods and enables the effective utilization of the exothermic heat of regeneration to raise the temperature of the oil charge to the reaction temperature and maintain it at such temperature during the processing periods.

To accomplish the effective utilization in processing of the heat liberated during regeneration, the processing cycle is of such limited duration that the oil feed, even though introduced at a temperature materially below the reaction temperature, will not fall below the reaction temperature during processing. The cracking reaction is essentially endothermic and in prior catalytic cracking processes it has been necessary to preheat the oil, before contacting with the catalyst, to the temperature of reaction, in fact, to a temperature somewhat higher than the temperature maintained during the contacting with the catalyst. In accordance with the present invention, it is not necessary to heat the oil to a temperature even approximating the temperature desired for the catalytic reaction, since in the present process the heat of regeneration is actually used to raise the oil to the desired temperature of reaction and to maintain it at such temperature during the processing cycle.

In accordance with the invention, the complete cycle of processing and regenerating including purging is of the order of some 4–5 seconds up to approximately 30 seconds. The processing period is about 1–10 seconds, the regenerating period about 2–20 seconds and the purging periods which follow the processing and regenerating are each of about ½–1 second. Thus, for example, a complete cycle of 4 seconds may involve processing 1 second, purging ½ second, regenerating 2 seconds, purging ½ second; in another example, a complete cycle of 7–9 seconds may involve, processing 2 seconds, purging 1 second, regenerating 3–5 seconds, purging 1 second, and in another example a complete cycle of 32 seconds may involve processing 10 seconds, purging 1 second, regenerating 20 seconds, purging 1 second.

With these short processing cycles approximating 1–10 seconds the oil in vaporous or liquid state or partially vaporized condition is fed to the catalyst with extremely high space velocities of the order of 100–400 or 500 volumes of liquid oil feed per hour per volume of catalyst. At the high level of activity at which the catalyst is maintained by reason of the extremely short processing periods, conversions of some 40–60% may be readily obtained (the conversion being taken as the proportion of the feed that has been converted to gasoline, gas and carbon or as frequently expressed 100 minus the proportion of so-called cycle oil remaining). In general in prior fixed bed catalytic cracking processes which operate with space velocities around 1–3 a conversion around 50% is obtained with a carbon formation of about 4% by weight of the feed. In the practice of the invention with the same amount of conversion the carbon formation approximates 1%.

In order to effect a sufficiently rapid rate fo burning to satisfactorily remove the carbon in the limited time of the regenerating cycle, it is necessary to regenerate under a superatmospheric pressure. Pressures within the range of about 50–100 lbs. per square inch are recommended for this purpose. The processing should be conducted under a pressure approximating that of regenerating in order to avoid the difficulties that would ensue with material variations in pressure due to the resultant rapid sequence of contraction and expansion. There is no particular advantage in the use of pressures much above 100 lbs. for the reason that 100 lbs. pressure will insure a sufficiently rapid rate of burning in the regeneration cycle and since pressures above 100 lbs. are not satisfactory for the processing cycle because the octane number of the gasoline product is reduced as the pressure is increased above 100 lbs.

In the catalytic cracking of hydrocarbon oil, in accordance with the invention, the oil is contacted with the catalyst at the usual temperatures employed in catalytic cracking such as temperatures upwards of 850° F. and temperatures of the order of 900° F. and 1000° F. Since the heat liberated in regeneration of the catalyst is made available for supplying heat to the entering oil, it is not necessary in the process to preheat the oil to the reaction temperature. It is desirable, to preheat the oil a certain amount which, however, is materially below the reaction temperature. Thus the oil may be preheated to temperatures as low as 400–500° F. and the heat of regeneration utilized to raise the oil to the desired cracking temperature such as 900° F. or 950° F. In general, the oil is preferably preheated to about 600–700° F. before being charged to the catalyst chamber. It will be seen that the process thus has the important advantage of practically eliminating any thermal cracking effect.

The purging gas such as a steam or inert gas, which may be introduced following the processing step, should be heated to a temperature approximating the temperature of reaction. The purging gas such as steam or inert gas, which may be introduced following the regeneration step, should be preheated to a temperature approximating the temperature of regeneration. The air for regeneration should be preheated to at least about 900° F. in order to support ignition. A feature of particular advantage is that the process enables an extremely low variation in temperature between processing and regenerating; thus the variation may be as little as about 25–50° F.

In practicing the invention, any of the solid catalysts which are used in the cracking of hydrocarbons may be employed, such as naturally occurring or synthetic composites of silica and alumina. Various composites of precipitated silica and alumina are well-known as superior cracking catalysts. The catalyst is used in granular or pulverulent form, in pellets, in beads and the like. The catalyst is contained in a stationary or fixed bed in the reactor. The invention affords a method of utilizing certain catalysts of relatively low heat stability which have been discarded previously on account of the high temperature required in regeneration; these catalysts can now be used due to the relatively low temperature differential in processing and regeneration in my process.

Figure 1:
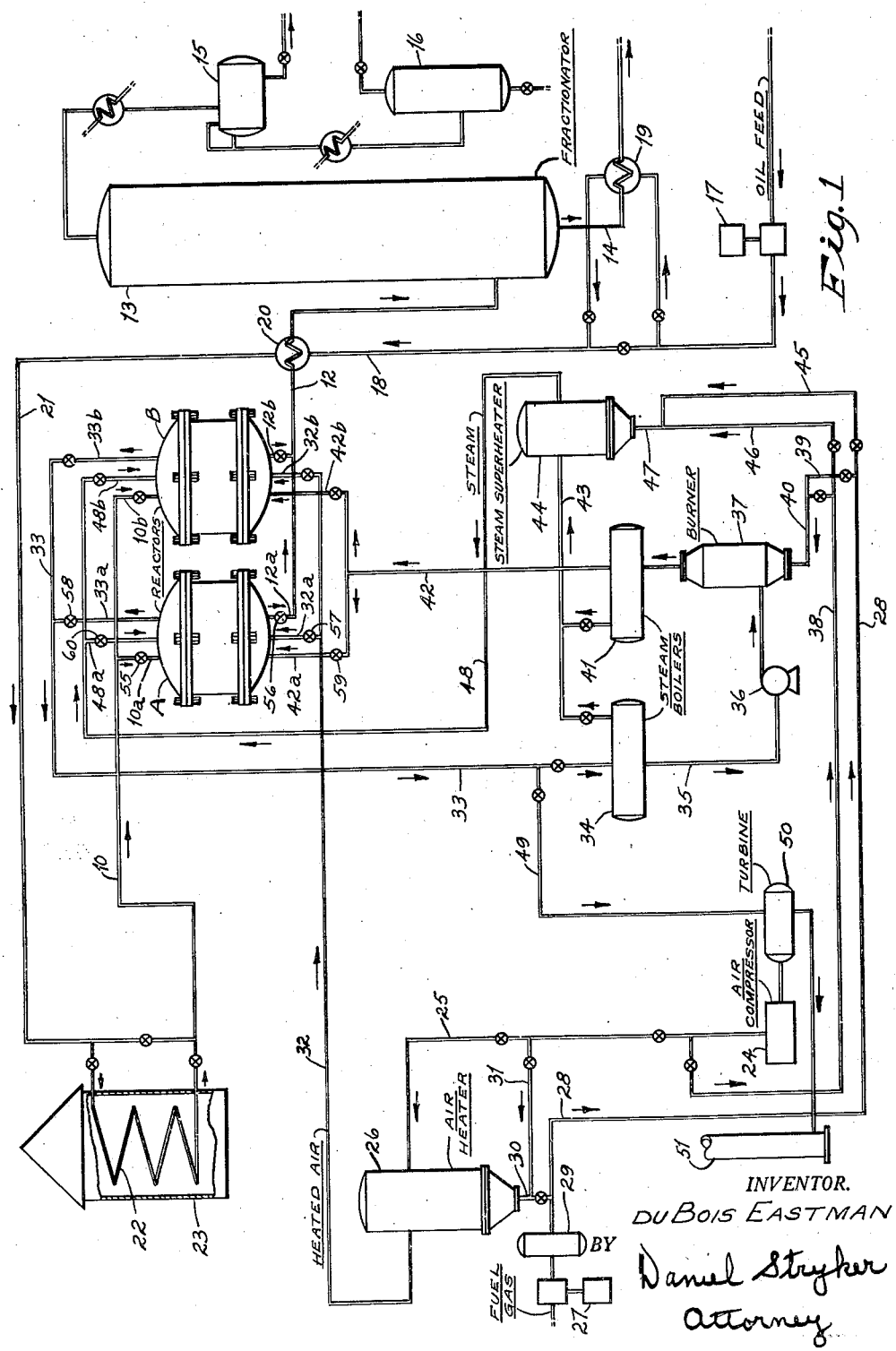
Fig. 1 is a flow diagram showing a particular embodiment of the invention.

In Fig. 1 a pair of reactors A and B are shown. The invention may be practiced satisfactorily with a single reactor since the processing periods proceed in such rapid sequence that the delivery of the products of reaction to the fractionator approaches continuous delivery. In other words, the sequence is so rapid that no difficulties in fractionating conditions are encountered due to intermittent delivery. It is advantageous, however, from the standpoint of capacity, to provide a plurality of reactors associated with a single fractionating zone.

Charging oil is directed through a line 10 having branch lines 10a and 10b to the respective reactors. Each reactor contains a mass of catalyst. The reaction products are removed through a line 12, having branch lines 12a and 12b from the reactors, and discharged into a fractionator 13. In the fractionator the products are subjected to fractionation to separate the higher boiling material which is withdrawn through a line 14. The overhead vapors pass through a cooler to a water separator 15 from which the water is withdrawn. The hydrocarbon condensate, together with uncondensed vapors and gases, passes through a second cooler to a distillate receiving drum 16 wherein the distillate is collected.

The oil to be subjected to the catalytic cracking is drawn from a suitable source by a pump 17 and directed through a line 18. The oil charge may be preheated by being routed through an exchanger 19 for heat exchange with the high boiling products being withdrawn from the fractionator 13. Thus for example, the bottoms from the fractionator may be withdrawn at temperatures approximating 750° F. and the charging stock, passed in indirect heat exchange with this hot oil, may be preheated to temperatures approximating 300° F. The preheated oil then flows through an exchanger 20 for heat exchange with the hot effluent which passes from the reactors through line 12. Thus for example, with the process effluent flowing from the reactors at a temperature of about 975° F., the charging stock in indirect heat exchange therewith may be raised to temperatures approximating 500° F. while the cooled process effluent is delivered to the fractionator at temperatures approximating 850° F. The charging oil thus preheated flows through line 21 thence through line 10 to the several reactors.

When it is desired to preheat the charging oil to a higher temperature than that obtained by the heat exchange with the products of reaction, the oil may be directed to a heating coil 22 disposed in a furnace 23. In this coil the oil may be raised to a somewhat higher temperature than the preheat temperature, such as a temperature of 600–700° F. With ordinary gas oil stocks particularly the higher boiling stocks the carbon production upon catalytic cracking will normally be sufficient to supply in regeneration the heat required to raise the oil to the processing temperature and maintain it at such temperature during the processing cycle. Thus by preheating such stocks to a temperature around 500–600° F. by heat exchange with the hot products of reaction no heating in the coil 22 may be required. In the case of certain light stocks of the character of kerosene or light gas oil which upon catalytic cracking produce smaller amounts of carbon, it is desirable to supply some additional heat to the oil by passage through the coil 22 so as to raise the oil to temperatures approximating the 800° F. level.

In any case, the oil is delivered to the several reactors at temperatures materially below the reaction temperature and the heat of regeneration is relied on to raise the oil to the desired processing temperature and maintain it at that temperature during the processing cycle. Preheating temperatures around the 700° F. level may be recommended in general as affording a satisfactory operation for ordinary gas oil stocks. The oil thus preheated is rapidly raised to processing temperatures of the order of 900–1000° F. by contacting with the hot bed of catalyst heated in the regenerating cycle.

In regenerating the catalyst, an air compressor 24 directs air through the line 25 to an air heater 26. Fuel gas is supplied by a compressor 27 through a line 28 in which may be inserted a surge drum 29. The fuel gas is delivered through a branch line 30, together with air admitted through a branch line 31 from air line 25, to effect combustion for heating the air. The air preheated to a temperature of about 950° F. is delivered through line 32 thence through branch lines 32a and 32b to the respective converters. Upon contacting the catalyst mass with the heated air, the carbon deposits are ignited and burned thus reactivating the catalyst and storing heat in the catalyst for the succeeding processing period.

The effluent gases of regeneration are removed from the reactors through a line 33, having branch lines 33a and 33b, at temperatures such as 1050° F. The hot stream is advantageously delivered to a waste heat boiler 34 for generating steam.

Combustion gases produced in the regenerating step may advantageously be used as purging gas following the regeneration. The burning of the carbon on the catalyst is conducted with an excess of oxygen to assure the desired rapidity of burning. Consequently the regeneration gases which leave the steam generator 34 through a line 35 contain oxygen. It is desirable to remove this oxygen from the gases to render them suitable for purging purposes. In accomplishing this the gases flowing through line 35 are directed by a blower 36 to a burning chamber 37. Air introduced through a branch line 38 of the air line 25 and fuel gas directed through a branch line 39 of the fuel line 28 are commingled in line 40 in proper proportion for combustion and delivered to the chamber 37 to consume the excess oxygen in the gases delivered by the blower. The hot gases thus freed of oxygen are removed from the burner at high temperatures, as around 1900° F., and utilized in supplying heat to a second waste heat boiler 41 for generating steam. The cooling of the gases in the waste heat boiler serves to reduce the temperature to a temperature suitable for use as purging gas, such as 950–1050° F. The gases at such temperatures are delivered through a line 42 thence through lines 42a and 42b to the respective reactors.

Steam from the steam generators 34 and 41 is directed by a line 43 to a steam superheater 44. Fuel gas admitted through a branch line 45 of the gas line 28 and air admitted through a branch line 46 of the air line 38 are commingled in a line 47 to supply a mixture for burning to effect the superheating of the steam. The steam superheated to high temperatures around 900–975° F. is delivered from the superheater through a line 48 thence through branch lines 48a and 48b to the respective reactors. The steam is applied for purging following the processing period.

It is advantageous that the flow of hydrocarbon in processing and the flow of regenerating gas be in opposite directions through the catalyst bed. I have found that if the flow of hydrocarbon in processing and the flow of regeneration gas be conducted in the same direction through the catalyst bed there is a tendency to establish a temperature differential through the bed. To overcome this tendency the hydrocarbon and regenerating gas are passed in opposite directions through the catalyst bed. In the illustrative embodiment of the invention, the hydrocarbon flows downwardly through the bed and the steam purge which follows the processing step is also with downward flow while the flow of the regenerating gas and the flow of the purge with combustion gases which follows are both upward.

In lieu of using the effluent gases from the regenerating step for generating steam in the boiler 34, these gases or a portion thereof may be directed through a branch line 49 to a turbine 50 for operating the air compressor 24 or for operating other pumps or compressors employed in the process. The used gases are released through a stack 51.

Figure 2:
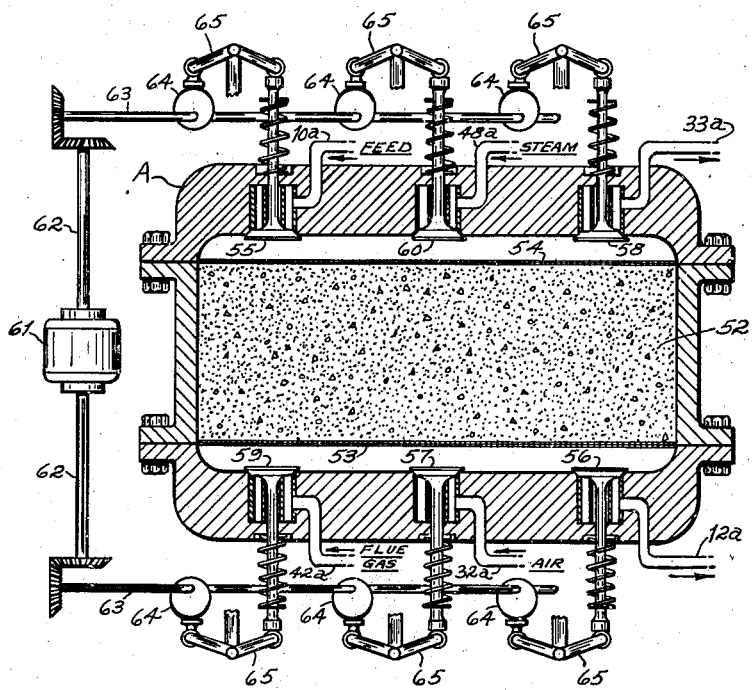
Fig. 2 is a schematic representation of a single reactor showing a convenient means of valve control for the inflow and outflow of hydrocarbons and regenerating and purging gases.

In Fig. 2 is shown a single reactor containing a bed of catalyst 52 supported on screen 53. A screen 54 is disposed above the catalyst in order to prevent the catalyst from being blown out by gases flowing upwardly through the catalyst bed. A valve 55 controls the admission of hydrocarbon to be processed through line 10a. A valve 56 controls the discharge of reaction products through line 12a to the fractionator. A valve 57 controls the admission of air through line 32a for regeneration. A valve 58 controls the discharge of combustion gases through line 33a. A valve 59 controls the admission of flue gas through line 42a to effect purging following regeneration. A valve 60 controls the admission of steam through line 48a to effect purging following processing. A motor 61 operates drive shafts 62 each of which is geared to a shaft 63 carrying a plurality of cams or eccentrics 64, for activating the several valves through rocker arms 65. By this means, the valves are opened and closed with precision in accordance with the time cycle for processing, purging and regeneration.

In a complete cycle of operations, with valves 55 and 56 open hydrocarbon is admitted for processing through line 10a and the products of reaction are discharged through line 12a to the fractionator, with valves 60 and 56 open steam is admitted through line 48a and the effluent is discharged through line 12a to the fractionator, with valves 57 and 58 open air for regeneration enters through line 32a and combustion gases are discharged through line 33a, with valves 59 and 58 open purging gas is admitted through line 42a and the effluent is discharged through line 33a.

Since the oil as introduced to the reactor will generally be in a liquid or mixed vaporous and liquid state, it is preferable to discharge the oil feed from the lines, as 10A and 10B, into the reactors through a nozzle or spray in order to atomize the hydrocarbon and diffuse and distribute the feed for uniform flow through the catalyst bed. An advantageous method of accomplishing this atomization and distribution through the bed is to pass the feed through an orifice discharging on to a spreader plate.

In catalytic cracking the extent of conversion employed has usually been within a range of some 40–60%. In order to obtain the most favorable conversion for the production of gasoline, that is, for the highest gasoline to gas ratio commensurate with a satisfactory gasoline yield, it is generally desirable to maintain the conversions at levels approximating 40–50%. In general, as the conversion is increased above 50%, the gasoline to gas ratio becomes increasingly unfavorable but these higher conversions have been used, as in the recent war period, for the purpose of obtaining given yields of certain normally gaseous products in addition to the gasoline. In accordance with the invention, the extent of conversion desired may be readily obtained under the short processing cycles with the accompanying high space velocities. Moreover, the operation may be conducted with the correspondingly short periods of catalyst regeneration so that the advantage of high specific throughputs in processing is not vitiated by the time required for regeneration.

When practicing the invention for the purpose of obtaining a maximum yield of gasoline accompanied with the most favorable gasoline to gas ratio and using, for example, processing periods of 10 seconds, the best yield and product distribution is obtained at space velocities within a range of about 100–200. With lower processing periods the critical space velocities are correspondingly increased to higher levels up to levels of the order of 400 or 500 which are about the practicable maxima. The age of the catalyst affects its activity and in the case of catalyst which has been used in repeated processing and regenerating cycles for a considerable period of time the upper limits of the space velocity for the best yield and product distribution will be around 200 or 300.

The invention enables good conversions with much higher oil to catalyst ratios or with much higher specific throughputs than have heretofore been used in fixed bed catalytic cracking. The process is consequently highly attractive from the standpoint of reduced equipment size and catalyst inventories. The equipment required is very small in comparison to that required in the fluid type of catalytic cracking. Thus, for example, in the case of a plant having a 15,000 barrel per day feed rate, instead of the huge installation and catalyst inventory required for this capacity in fluid catalytic cracking, it is indicated that in an operation in accordance with the invention a small installation, say with 4 reactors, each with only 6 barrels of catalyst and with a total catalyst inventory of about 3 tons, will afford an equal capacity.

The invention is adapted for producing a superior gasoline product, thus for instance, in cracking an East Texas gas oil of 700° F. end point over a synthetic silica-alumina-zirconia catalyst with conversions of 40–55% and gasoline yields of 30–35% the gasoline had clear octane value of 80.5–82.2 CFRM and values of 93.5–94.6 CFRR. With 3 cc. of tetraethyl lead the octane values were increased to 84.9–87.0 CFRM and 98.6–99.0 CFRR.

Although a preferred embodiment of the invention has been described herein, it will be understood that various changes and modifications may be made therein, while securing to a greater or less extent some or all of the benefits of the invention, without departing from the spirit and scope thereof.

I claim:

1. In the catalytic cracking of hydrocarbon oils for the production of gasoline wherein the process is conducted with successive cycles of processing and regenerating in which carbon deposited on the catalyst in the processing periods is burned in the regenerating periods to reactivate the catalyst, the process that comprises maintaining the several processing periods of limited duration of the order of 1–10 seconds, charging the oil in the processing periods at a rate corresponding to about 100–500 liquid volumes of oil per hour per volume of catalyst passing an oxygen-containing gas through the catalyst in the several regenerating periods for a limited time of duration of the order or 2–20 seconds and maintaining a superatmospheric pressure of the order of 50–100 pounds per square inch on the catalyst in the regenerating periods to thereby maintain a sufficiently rapid rate of burning in the limited periods to effect reactivation and maintain the catalyst at a high level of activity for the processing periods.

2. In the catalytic cracking of hydrocarbon oils for the production of gasoline wherein the process is conducted with successive cycles of processing and regenerating in which carbon deposited on the catalyst in the processing periods is burned in the regenerating periods to reactivate the catalyst, the process that comprises maintaining the several processing periods of limited duration of the order of 1–10 seconds, charging the oil in the processing periods at a rate corresponding to about 100–500 liquid volumes of oil per hour per volume of catalyst and passing an oxygen-containing gas through the catalyst in the regenerating periods for a limited time of duration of the order of 2–20 seconds to effect reactivation of the catalyst and store sufficient heat in the catalyst mass to maintain the reaction temperature in the succeeding processing period.

3. In the catalytic cracking of hydrocarbon oils for the production of gasoline wherein the process is conducted with successive cycles of processing and regenerating in which carbon deposited on the catalyst in the processing periods is burned in the regenerating periods to reactivate the catalyst, the process that comprises introducing the oil to the catalyst chamber in the processing periods at a temperature materially below the reaction temperature and of the order of 400–700° F. for passage through a mass of hot regenerated catalyst whereby the oil is immediately raised to a reaction temperature of upwards of 850° F. by means of the heat contained in the catalyst, maintaining the flow of oil through the catalyst mass for a limited period of the order of 1–10 seconds so that the oil flowing therethrough does not fall below the reaction temperature during the processing period, passing the oil through the catalyst in the processing periods at a rate corresponding to about 100–500 liquid volumes of oil per hour per volume of catalyst, passing an oxidizing gas through the catalyst mass in the regenerating periods to effect burning of deposited carbon and reactivation of the catalyst, maintaining combustion in the catalyst mass in the regenerating periods for a limited time of the order of 2–20 seconds to thereby store sufficient heat in the catalyst mass for the succeeding processing period while avoiding such a rise in temperature as to impair the catalyst, and maintaining said rapid cycles of processing and regenerating whereby the catalyst is maintained at a high level of activity for processing and the heat in the regenerated catalyst is utilized to raise the entering oil to the reaction temperature and maintain such temperature during processing.

4. In the catalytic cracking of hydrocarbon oils for the production of gasoline wherein the process is conducted with successive cycles of processing and regenerating in which carbon deposited on the catalyst in the processing periods is burned in the regenerating periods to reactivate the catalyst, the process that comprises maintaining the several processing periods of limited duration of the order of 10 seconds, charging the oil in the processing periods at a rate corresponding to about 100–200 liquid volumes of oil per hour per volume of catalyst and passing an oxygen-containing gas through the catalyst in the several regenerating periods for a limited time of duration of the order of 20 seconds to effect reactivation of the catalyst.

5. In the catalytic cracking of hydrocarbon oils for the production of gasoline wherein the process is conducted with successive cycles of processing and regenerating in which carbon deposited on the catalyst in the processing periods is burned in the regenerating periods to reactivate the catalyst, the process that comprises maintaining the several processing periods of limited duration of the order of 1–2 seconds, charging the oil in the processing periods at a rate corresponding to about 100–500 liquid volumes of oil per hour per volume of catalyst and passing an oxygen-containing gas through the catalyst in the several regenerating periods for a limited time of duration of the order of 2–5 seconds to effect reactivation of the catalyst.

DU BOIS EASTMAN.

REFERENCES CITED

The following references are of record in the file of this patent:

UNITED STATES PATENTS

| Number | Name | Date |
| --- | --- | --- |
| 1,973,851 | Feiler et al. | Sept. 18, 1934 |
| 2,073,638 | Houdry | Mar. 16, 1937 |
| 2,137,275 | Ellis | Nov. 22, 1938 |
| 2,161,676 | Houdry | June 6, 1939 |
| 2,174,196 | Rogers | Sept. 26, 1939 |
| 2,246,345 | Campbell | June 17, 1941 |
| 2,319,590 | Eastman et al. | May 18, 1943 |
| 2,357,332 | Kelly et al. | Sept. 5, 1944 |
| 2,388,536 | Gunness | Nov. 6, 1945 |